US011910144B2

(12) United States Patent
Unsal et al.

(10) Patent No.: US 11,910,144 B2
(45) Date of Patent: Feb. 20, 2024

(54) HIGH TEMPERATURE HIGH PRESSURE ACOUSTIC SENSOR DESIGN AND PACKAGING

(71) Applicants: Necmi Unsal, Lower Saxony (DE); Tobias Colista, Lower Saxony (DE)

(72) Inventors: Necmi Unsal, Lower Saxony (DE); Tobias Colista, Lower Saxony (DE)

(73) Assignee: BAKER HUGHES OILFIELD OPERATIONS LLC, Houston, TX (US)

( * ) Notice: Subject to any disclaimer, the term of this patent is extended or adjusted under 35 U.S.C. 154(b) by 0 days.

(21) Appl. No.: 17/871,043

(22) Filed: Jul. 22, 2022

(65) Prior Publication Data

US 2023/0027469 A1 Jan. 26, 2023

Related U.S. Application Data

(60) Provisional application No. 63/224,543, filed on Jul. 22, 2021.

(51) Int. Cl.
*H04R 1/08* (2006.01)
*H04R 1/28* (2006.01)
*H04R 1/04* (2006.01)
*H04R 1/44* (2006.01)

(52) U.S. Cl.
CPC ............... *H04R 1/083* (2013.01); *H04R 1/04* (2013.01); *H04R 1/2876* (2013.01); *H04R 1/44* (2013.01)

(58) Field of Classification Search
CPC ........ H04R 1/083; H04R 1/04; H04R 1/2876; H04R 1/44; E21B 33/0355; E21B 47/0025; E21B 47/0224; E21B 47/085; E21B 47/095; E21B 47/107; E21B 47/14–24
See application file for complete search history.

(56) References Cited

U.S. PATENT DOCUMENTS

| | | | |
|---|---|---|---|
| 3,660,809 | A | 5/1972 | Pearson |
| 6,418,792 | B1 | 7/2002 | Spychalski |
| 6,498,769 | B1 | 12/2002 | Pearce |
| 7,075,215 | B2 | 7/2006 | Yogeswaren |

(Continued)

FOREIGN PATENT DOCUMENTS

WO 2019162672 A1 8/2019

OTHER PUBLICATIONS

International Search Report dated Oct. 26, 2022, Application Serial No. PCT/US2022/038004; Filed: Jul. 22, 2022, 3 pages.

*Primary Examiner* — Mark Fischer
(74) *Attorney, Agent, or Firm* — CANTOR COLBURN LLP

(57) ABSTRACT

A system including a work string and an acoustic device for sensing or transmitting an acoustic signal at least partially traveling through a borehole fluid within a wellbore and a method of operation. The acoustic device includes a compensation fluid, an acoustic transducer at least partially disposed in the compensation fluid and configured to sense the acoustic signal, and a metallic cover that separates the compensation fluid from the borehole fluid and configured to deform in response to a pressure difference between the borehole fluid and the compensation fluid. The acoustic device is conveyed into the wellbore and an electric signal is sent or received with the processor to or from the acoustic transducer.

19 Claims, 4 Drawing Sheets

(56) References Cited

U.S. PATENT DOCUMENTS

| | | | | |
|---|---|---|---|---|
| 7,082,079 | B2 | 7/2006 | Woo | |
| 7,369,716 | B2 | 5/2008 | Berg et al. | |
| 7,825,568 | B2 | 11/2010 | Andle | |
| 8,286,475 | B2 | 10/2012 | Nakajima et al. | |
| 2005/0000279 | A1 * | 1/2005 | Yogeswaren ...... | G01N 29/2462 73/152.58 |
| 2007/0084277 | A1 * | 4/2007 | Steinsiek ............. | G01N 29/222 73/152.58 |
| 2009/0183941 | A1 * | 7/2009 | Pabon .................... | G01V 1/523 181/102 |
| 2010/0000311 | A1 * | 1/2010 | Nakajima .............. | G01V 1/186 73/152.47 |
| 2012/0111437 | A1 | 5/2012 | Deville et al. | |
| 2014/0375467 | A1 * | 12/2014 | Lilly ....................... | E21B 47/13 340/854.4 |
| 2015/0322782 | A1 | 11/2015 | Khajeh et al. | |
| 2018/0329094 | A1 | 11/2018 | Goenner et al. | |
| 2019/0003303 | A1 | 1/2019 | Donzier | |
| 2020/0271812 | A1 | 8/2020 | Leonard | |

* cited by examiner

HIGH TEMPERATURE HIGH PRESSURE ACOUSTIC SENSOR DESIGN AND PACKAGING

CROSS REFERENCE TO RELATED APPLICATIONS

This application claims priority to U.S. Provisional Application Ser. No. 63/224,543, filed on Jul. 22, 2021, the contents of which are incorporated herein by reference in their entirety.

BACKGROUND

In the resource recovery industry, a work string can be disposed in a wellbore in order to perform operations in a downhole formation. These work strings can have one or more acoustic sensors for measuring a property of the formation or of a fluid in the formation. The acoustic sensors must withstand high pressure of up to 30 kpsi (kilo pounds per square inch) and temperature up to 175° C. and measure small pressure differences. Generally, a compensation fluid is employed in a body of the acoustic sensor in order to help the acoustic sensor withstand high pressures and temperatures and to aid in measuring small pressure differences indicative of the acoustic signal. A piston may be used to compensate for expansion and contraction of the compensation fluid due to temperature and pressure changes by taking in volume during expansion and releasing volume during contraction. The piston typically moves along a cylindrical wall, and carries a seal, e.g., an O-ring, to prevent leakage of the oil. As a result of this piston movement, it can lead to wear and abrasion on the piston or seal especially in the presence of borehole fluid (e.g., drilling fluid or mud) that may contain sand or other solids. Since the piston is a moving part, it wears out over time to either inhibit the quality of the sensor or render it useless. Alternatively, a polymer diaphragm that deforms in response to a pressure difference to compensate for expansion and contraction of the compensation fluid due to temperature and pressure changes may be used to compensate for expansion and contraction of the compensation fluid. A polymer diaphragm, however, is not resistant to gas diffusion. Hence, dissolved gas can pass through the membrane and change to gas phase during pressure release when the acoustic sensor is removed from downhole and brought back to the earth's surface which can bloat or even burst the diaphragm and create significant safety issues when maintaining the acoustic sensor on the earth's surface. Also, water can pass through the diaphragm and get dissolved on the compensation fluid which may change the characteristics of the compensation fluid that would create a drift on the acoustic sensors. Significant swelling and bloating/bursting of the polymer diaphragm results in excess maintenance or even in destruction of the membrane. Therefore, there is a need for an acoustic sensor that is effective and durable in high pressure and high temperature environments without moving parts that cause wear on the acoustic sensor.

SUMMARY

Disclosed herein is an acoustic device for sensing or transmitting an acoustic signal at least partially traveling through a borehole fluid within a wellbore. The acoustic device includes a compensation fluid, an acoustic transducer at least partially disposed in the compensation fluid and configured to sense the acoustic signal, and a metallic cover that separates the compensation fluid from the borehole fluid and configured to deform in response to a pressure difference between the borehole fluid and the compensation fluid.

Also disclosed herein is a system for use in a wellbore including a work string and the acoustic device.

Also disclosed herein is a method for sensing or transmitting an acoustic signal at least partially traveling through a borehole fluid within a wellbore. An acoustic device is conveyed into the wellbore, the acoustic device including a compensation fluid, an acoustic transducer at least partially disposed in the compensation fluid and configured to sense the acoustic signal, a metallic cover that separates the compensation fluid from the borehole fluid and configured to deform in response to a pressure difference between the borehole fluid and the compensation fluid, and a processor in connection with the acoustic transducer. An electric signal is sent or received with the processor to or from the acoustic transducer.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
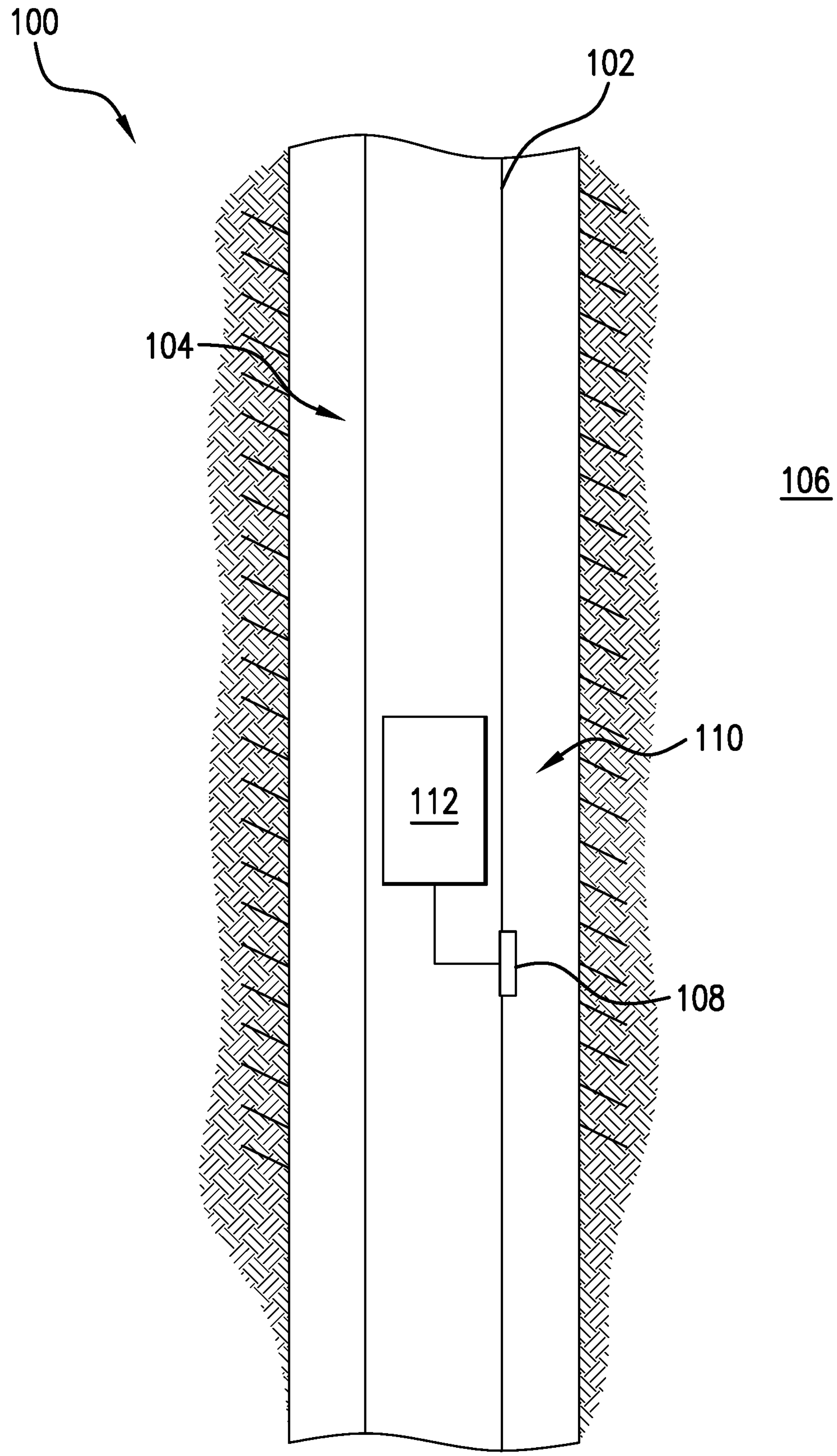
FIG. 1 shows a downhole system in an embodiment.

Referring to FIG. 1, a downhole system 100 is disclosed in an embodiment. The downhole system includes a work string 102 disposed in a wellbore 104 formed in a formation 106. The work string 102 can include a drill string, a wireline string, a completion string, or other suitable string used downhole, in various embodiments. The work string 102 includes an acoustic sensor 108 disposed thereon for detecting an acoustic signal that can be traveling through the formation 106 and/or through a downhole fluid 110 (also known as borehole fluid, such as drilling fluid or drilling mud, sometimes simply referred to as mud) in the wellbore 104. The acoustic sensor 108 translates the acoustic signal into an electrical signal that can be sent to a processor 112. The processor 112 can determine, for example, a property of the formation 106 or of the downhole fluid 110 from the electrical signal. The processor 112 can also determine or receive instructions to execute an action to be taken by the work string 102 downhole based on the property of the formation 106 or of the downhole fluid 110.

Figure 2:
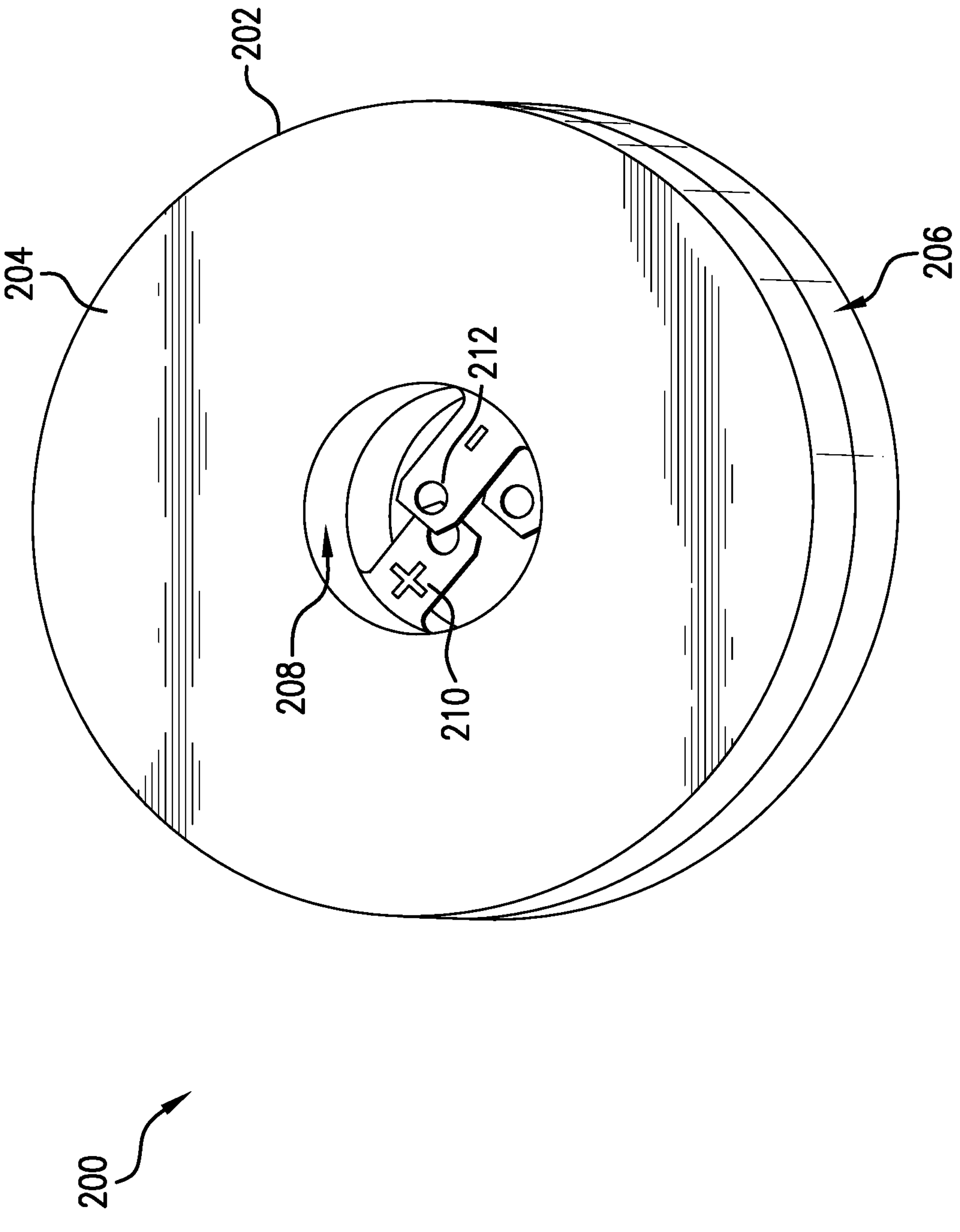
FIG. 2 shows a perspective view of an acoustic transducer that can be used in an acoustic sensor of the downhole system.

FIG. 2 shows a perspective view 200 of an acoustic transducer 202 that in one embodiment can be used as an acoustic sensing material in the acoustic sensor 108, in an embodiment. The acoustic transducer 202 (e.g., the acoustic sensing element) can be a piezoelectric material or piezoceramic material that generates an electrical current in response to an acoustic signal or pressure signal. In this embodiment, the acoustic transducer 202 is in the shape of a cylindrical shell or a ring which has a receiving face 204, a radially outer surface 206 and a radially inner surface 208. The ring shape or cylinder shape of acoustic transducer 202 is beneficial in particular when the acoustic sensor 108 is of cylindrical shape as outlined below. However, this is not meant to be a limitation. Other shapes of the acoustic transducer 202 such as elliptical, oval, rectangular (e.g., rectangular with rounded edges) or even irregular shapes may be used as well. A first terminal 210 (e.g., a positive terminal) extends radially inward (i.e., radially inward with respect to an axis of the acoustic transducer 202—such as longitudinal axis 314 in FIG. 3—, the axis being orthogonal to the longitudinal axis of the work string 102) from the radially inner surface 208 at a first azimuthal location. A second terminal 212 (e.g., a negative terminal) extends radially inward from the radially inner surface 208 at a second azimuthal location. Location of the first and/or second terminal 210, 212 radially inward from the radially inner surface 208 saves space and avoids unnecessary wiring without compromising the performance of the acoustic sensor 108 too much. The ring or cylindrical shape of the acoustic transducer 202 is an embodiment that allows for the required space to place the first or second terminal 210, 212 radially inward from the radially inner surface 208. In various embodiments, the first azimuthal location is 180 degrees from the second azimuthal location.

Figure 3:
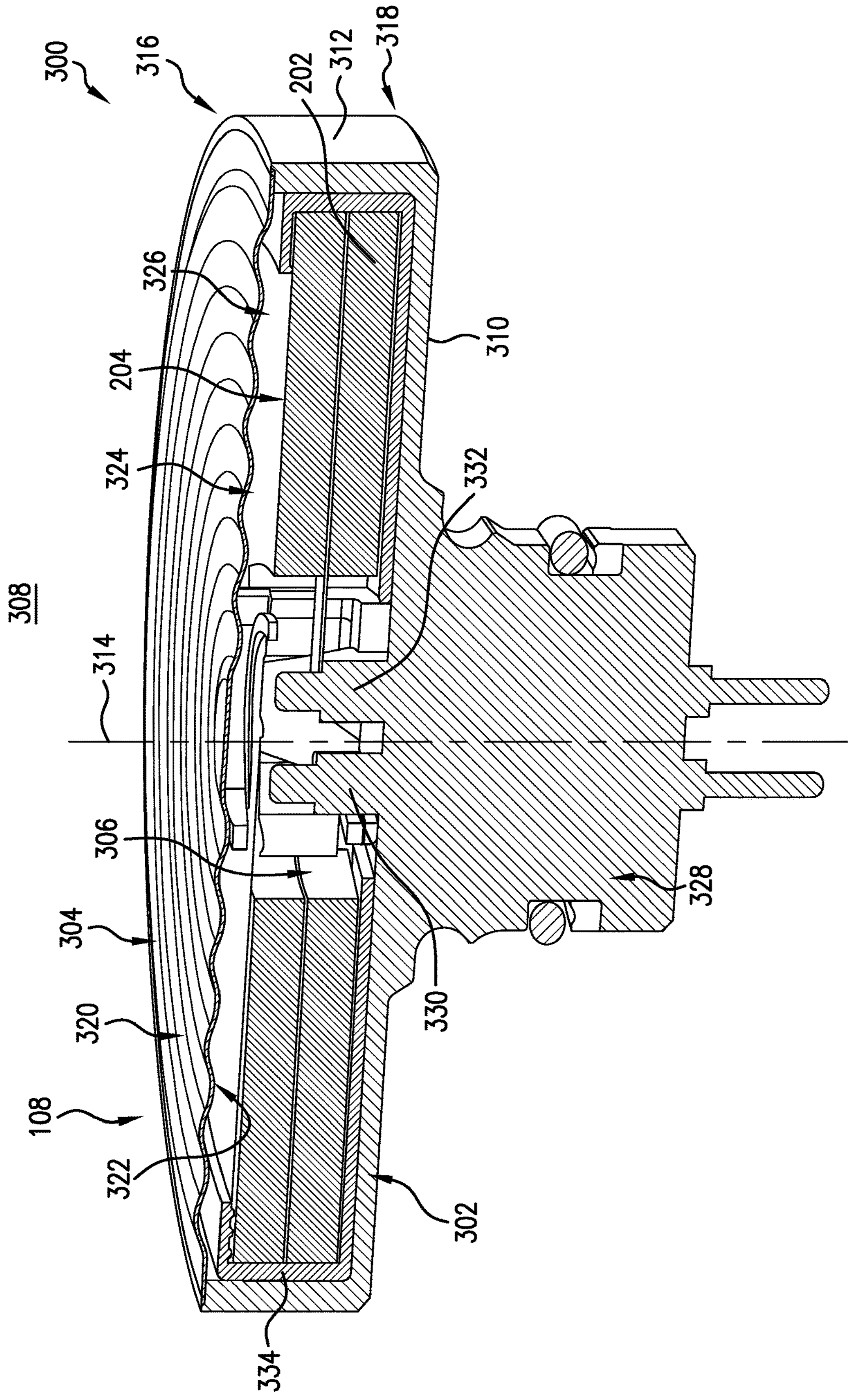
FIG. 3 shows a cross-sectional view of the acoustic sensor, in an embodiment.

FIG. 3 shows a cross-sectional view 300 of the acoustic sensor 108 of FIG. 1, in an embodiment. The acoustic sensor 108 includes a backing 302 or housing and an acoustic membrane 304. The acoustic membrane 304 can be made of a metallic material or of a more elastic material, such as rubber. The acoustic membrane 304 is coupled to the backing 302 to form or enclose a chamber 306 that is isolated from a region 308 that is exterior to the acoustic sensor 108, such as a downhole environment of the wellbore 104. The backing 302 includes a back surface 310 and a sidewall 312. The back surface 310 and the sidewall 312 can be made as a single continuous piece. Alternatively, they can be made of separate pieces that are joined together, for example joined together by welding, gluing, brazing, threaded connections, or combinations thereof. In various embodiments, the back surface 310 is a planar surface having shape that corresponds to the shape of the acoustic transducer 202. For example, in an embodiment where the acoustic transducer 202 has a circular shell or ring shape, the back surface 310 may have a circular perimeter. The back surface 310 is orthogonal to a longitudinal axis 314 of the acoustic sensor 108 which in turn is orthogonal to the longitudinal axis of the work string 102. The sidewall 312 forms a cylindrical shell concentric with the longitudinal axis 314. The sidewall 312 extends from a first end 316 at a front of the acoustic sensor 108 to the back surface 310 at a second end 318. The acoustic membrane 304 is coupled to the sidewall 312 at the first end 316. The acoustic membrane 304 is in the shape of a circular disk and a circumference of the acoustic membrane 304 is coupled to the sidewall 312 at the first end 316. In alternate embodiments of the acoustic sensor 108, the acoustic membrane 304 can have different shapes (e.g., an oval, elliptic, rectangular—e.g., rectangular with rounded edges—or even an irregular shape). The acoustic membrane 304 can be coupled to the sidewall 312 via a weld such as produced by a laser welding process. Welding, in particular, provides for a reliable fluid-tight connection. In other embodiments, the acoustic membrane 304 is coupled to the sidewall 312 by gluing or brazing or via a threaded connection, such as by a securing device, e.g., a bolt or a screw. However, welding, gluing, or brazing would have the benefit that the complete assembly that builds the acoustic sensor 108 can be assembled without a threaded connection, such as a bolt or a screw.

The acoustic membrane 304 includes a first face 320 and a second face 322 opposite the first face 320. The first face 320 faces the region 308 and is in acoustically coupled to the region 308. The second face 322 faces the chamber 306 and is acoustically coupled the chamber 306. The acoustic transducer 202 is disposed within the chamber 306 with the receiving face 204 facing the second face 322 of the acoustic membrane 304 and with a gap 324 separating the receiving face 204 from the second face 322. The chamber 306 is filled with a fluid 326, such as oil (e.g., hydraulic oil, silicone oil), which also fills in the gap 324. An insulating material 334 is disposed between the backing 302 and the acoustic transducer 202 and/or between the sidewall 312 and acoustic transducer 202 to support the acoustic transducer 202 and to provide acoustic and/or electrical insulation between the acoustic transducer 202 and the backing 302/sidewall 312. In addition, in some embodiments, the insulating material 334 may cover at least a portion of the receiving face 204. In aspects, the layer of insulating material 334 may also be configured to dampen mechanical shocks or vibrations caused by harsh downhole operations, such as drilling, that can cause damage of the acoustic sensor 108. In one or more embodiments, the insulating material 334 comprises various layers where each layer material is selected to provide for the various functions of the insulating material 334 (such as, but not limited to, supporting the acoustic transducer 202, acoustically insulating the acoustic transducer 202 from the backing 302, electrically insulating the acoustic transducer 202 from the backing 302, and dampening mechanical shocks or vibrations). In one or more embodiments, the layer of insulating material 334 is at least partially made of elastomer or rubber.

An acoustic signal originating in the region 308 passes from the region 308 into the acoustic membrane 304 via the first face 320, out of the acoustic membrane 304 via the second face 322, through the fluid 326 in the gap 324 and into the acoustic transducer 202 via the receiving face 204. The acoustic membrane 304 serves a dual function of balancing or compensating a hydrostatic pressure between the downhole fluid 110 in the region 308 and the fluid 326 in the chamber 306 and transmitting the acoustic signal from the region 308 to the acoustic transducer 202 via the fluid 326. Since the acoustic membrane 304 performs both pressure balancing/compensating and acoustic transmission, the acoustic sensor 108 operates without any mechanical parts (e.g., parts made of metal, rubber, or plastic) in contact with each other and moving relative to each other which necessarily would create friction and wear. Utilizing a piston translating within the chamber 306 and sealed by sealing elements, for example, to compensate or balance the pressure within chamber 306 and the pressure in region 308 exterior to acoustic sensor 108, would create friction between the piston and the sealing elements and thus would create wear on at least one of the piston and the sealing elements.

The backing 302 further includes a protruded section 328 located at the backing 302 and that extends from the back surface 310 in a direction away from the chamber 306. FIG. 3 shows the protruded section 328 located centrally at the hacking 302. However, this is not to be understood as a limitation. In other embodiments, the protruded section 328 may be located de-centralized without departing from the scope of the invention. The protruded section 328 can be a high-pressure feedthrough that provides an electrical connection between the acoustic transducer 202 and the work string 102. The high-pressure feedthrough may be configured to withstand pressure differences up to 30 kpsi at temperatures up to 175° C. In embodiments, the protruded section 328 may be an integral part with back surface 310 which in turn may be an integral part with the sidewall 312. A first electrical connector 330 extends into the chamber 306 to couple to the first terminal 210 of the acoustic transducer 202. A second electrical connector 332 extends into the chamber 306 to couple to the second terminal 212.

Figure 4:
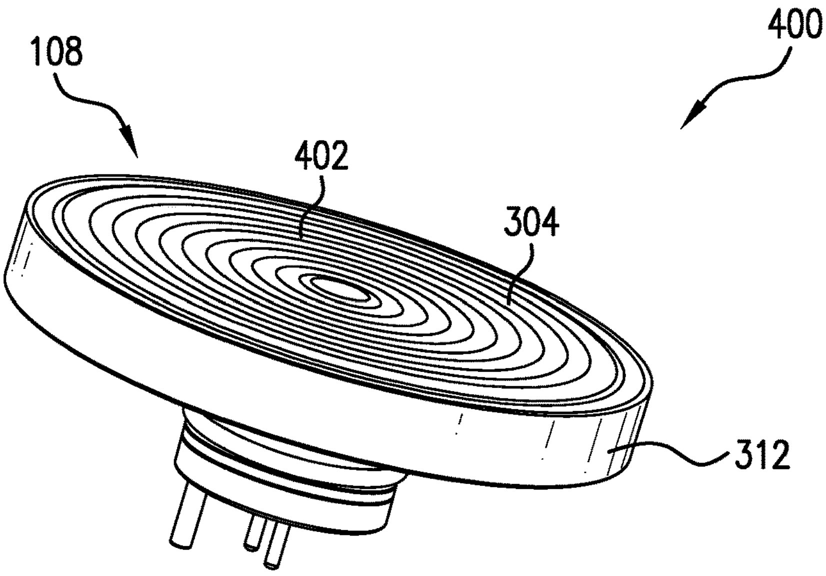
FIG. 4 shows a front perspective view of the acoustic sensor.

FIG. 4 shows a front perspective view 400 of the acoustic sensor 108, in an illustrative embodiment. The front perspective view 400 shows the outer surface (i.e., the first face 320) of the acoustic membrane. Circular corrugations 402 can be seen on the outer surface. The circular shape of corrugations 402 was chosen in this embodiment due to the circular shape of the acoustic membrane 304. In other embodiments, the acoustic membrane 304 may have another shape such as an oval, elliptical, rectangular (e.g., rectangular with rounded edges), or even an irregular shape. In such embodiments, corrugations 402 would have a corresponding oval, elliptical, rectangular (e.g., rectangular with rounded edges), or even an irregular shape without departing from the scope of this disclosure. However, the circular shape of the acoustic membrane 304 is beneficial as it allows to include corrugations 402 in a cost effective and reliable way. In addition, the circular shape of the acoustic membrane 304 provides a more constant response over a larger frequency band compared to acoustic membranes shaped differently (such as oval, elliptical, rectangular acoustic membranes).

Figure 5:
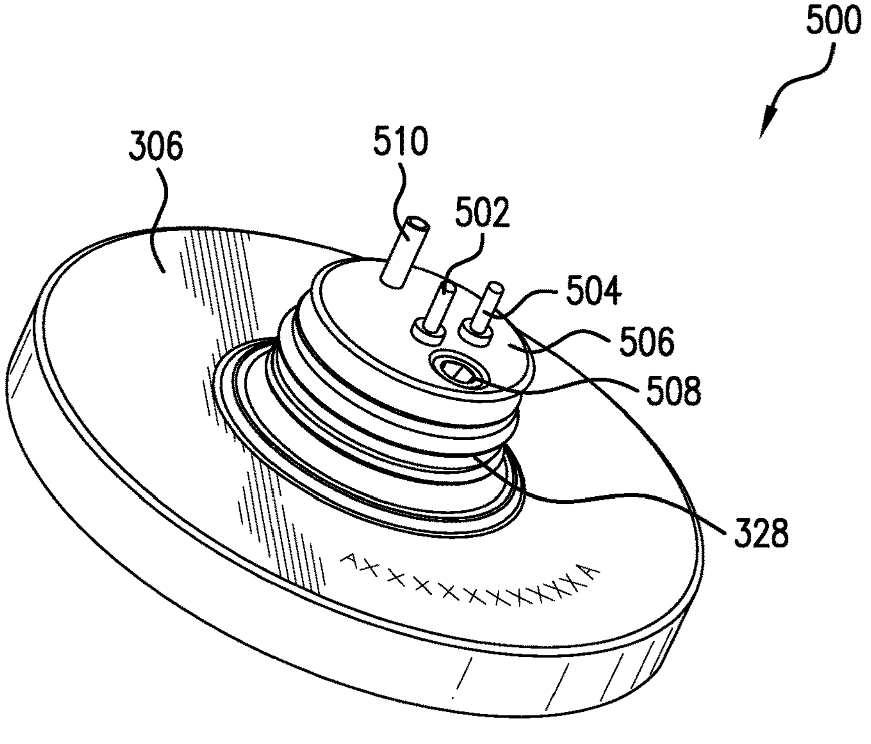
FIG. 5 shows a rear perspective view of the acoustic sensor.

FIG. 5 shows a rear perspective view 500 of the acoustic sensor 108 showing details of the protruded section 328. The protruded section 328 includes a first prong 502 electrically coupled to the first electrical connector 330 and a second prong 504 electrically coupled to the second electrical connector 332. The first prong 502 and second prong 504 extends from a rear face 506 of the protruded section 328 and can be inserted into complementary sockets (not shown) of the work string 102 for electrical connection of the acoustic sensor 108 to the processor 112. An alignment member such as an alignment pin 510 is located at the rear face 506. The alignment pin 510 connects into a corresponding alignment receptacle (not shown) of the work string 102 to aid in properly aligning the first prong 502 and the second prong 504 with the complementary sockets of the work string 102. In an alternate embodiment, alignment of first and second prong 502, 504 with the complementary sockets of the work string 102 is created by a tongue and groove system (not shown). In yet an alternate embodiment, the protruded section 328 has a different shape that is not rotationally symmetrical and that provide alignment guidance without additional alignment members. A port 508 is located at the rear face 506. The port 508 allows the fluid 326 to be introduced into the chamber 306 of the acoustic sensor 108. A plug or cap can be secured at the port 508 to close the port once the fluid 326 is in the chamber 306. In various embodiments, the port 508 can include one or more ports. While only one port 508 is shown in FIG. 5, two or more ports can be used to introduce the fluid 326 into chamber 306. For example, while the fluid 326 may be introduced into chamber 306 via a first port, a second port may be used to vent chamber 306 and to remove gas from chamber 306.

While the acoustic sensor 108 is described in operation as a receiver, the acoustic sensor can also be operated to transmit or emit acoustic signals by applying an electrical current to the acoustic transducer 202. A frequency of the emitted acoustic signal can be in an ultrasonic frequency range (i.e., greater than 20 kHz) but can be at a lower frequency, in various embodiments.

Set forth below are some embodiments of the foregoing disclosure:

Embodiment 1. An acoustic device for sensing or transmitting an acoustic signal at least partially traveling through a borehole fluid within a wellbore. The acoustic device includes a compensation fluid, an acoustic transducer at least partially disposed in the compensation fluid and configured to sense the acoustic signal, and a metallic cover that separates the compensation fluid from the borehole fluid and configured to deform in response to a pressure difference between the borehole fluid and the compensation fluid.

Embodiment 2. The acoustic sensor of any prior embodiment, wherein the metallic cover is substantially circular.

Embodiment 3. The acoustic sensor of any prior embodiment, wherein the compensation fluid is disposed within a housing and the metallic cover is welded to the housing.

Embodiment 4. The acoustic sensor of any prior embodiment, wherein the housing includes a pressure feed-through including at least one electrical connection.

Embodiment 5. The acoustic sensor of any prior embodiment, further including an insulating material between the acoustic transducer and the housing configured to provide at least one of an electrical insulation, an acoustic insulation, and a damping of mechanical shock or vibration.

Embodiment 6. The acoustic sensor of any prior embodiment, wherein the insulating material includes rubber.

Embodiment 7. The acoustic sensor of any prior embodiment, wherein the insulating material includes two or more layers.

Embodiment 8. The acoustic sensor of any prior embodiment, wherein the pressure difference is created by the acoustic signal and a hydrostatic pressure in the borehole fluid.

Embodiment 9. The acoustic sensor of any prior embodiment, wherein the metallic cover has one or more corrugations.

Embodiment 10. The acoustic sensor of any prior embodiment, wherein the acoustic transducer has an inner surface that is radially inward with respect to an axis of the acoustic device and a terminal for electrical connection extending from the inner surface.

Embodiment 11. The acoustic sensor of any prior embodiment, wherein the acoustic device is operable at a hydrostatic pressure of up to 30 kpsi and a temperature of up to 175° C.

Embodiment 12. A system for use in a wellbore including a work string and the acoustic device of Claim 1.

Embodiment 13. A method for sensing or transmitting an acoustic signal at least partially traveling through a borehole fluid within a wellbore. An acoustic device is conveyed into the wellbore, the acoustic device including a compensation fluid, an acoustic transducer at least partially disposed in the compensation fluid and configured to sense the acoustic signal, a metallic cover that separates the compensation fluid from the borehole fluid and configured to deform in response to a pressure difference between the borehole fluid and the compensation fluid, and a processor in connection with the acoustic transducer. An electric signal is sent or received with the processor to or from the acoustic transducer.

Embodiment 14. The method of any prior embodiment, wherein the metallic cover is substantially circular.

Embodiment 15. The method of any prior embodiment, wherein the compensation fluid is disposed within a housing and the metallic cover is welded to the housing.

Embodiment 16. The method of any prior embodiment, wherein the housing includes a pressure feed-through including at least one electrical connection to send or receive the electric signal with the processor to or from the acoustic transducer.

Embodiment 17. The method of any prior embodiment, further including an insulating material between the acoustic transducer and the housing configured to provide at least one of an electrical insulation, an acoustic insulation, and a damping of mechanical shock or vibration.

Embodiment 18. The method of any prior embodiment, wherein the insulating material includes rubber.

Embodiment 19. The method of any prior embodiment, further including creating the pressure difference by the acoustic signal and a hydrostatic pressure in the borehole fluid.

Embodiment 20. The method of any prior embodiment, wherein the metallic cover has one or more corrugations.

Embodiment 21. The method of any prior embodiment, wherein the acoustic transducer has an inner surface that is radially inward with respect to an axis of the acoustic device and a terminal for electrical connection extending from the inner surface.

The use of the terms "a" and "an" and "the" and similar referents in the context of describing the invention (especially in the context of the following claims) are to be construed to cover both the singular and the plural, unless otherwise indicated herein or clearly contradicted by context. Further, it should be noted that the terms "first," "second," and the like herein do not denote any order, quantity, or importance, but rather are used to distinguish one element from another. The terms "about", "substantially" and "generally" are intended to include the degree of error associated with measurement of the particular quantity based upon the equipment available at the time of filing the application. For example, "about" and/or "substantially" and/or "generally" can include a range of ±8% or 5%, or 2% of a given value.

The teachings of the present disclosure may be used in a variety of well operations. These operations may involve using one or more treatment agents to treat a formation, the fluids resident in a formation, a wellbore, and/or equipment in the wellbore, such as production tubing. The treatment agents may be in the form of liquids, gases, solids, semi-solids, and mixtures thereof. Illustrative treatment agents include, but are not limited to, fracturing fluids, acids, steam, water, brine, anti-corrosion agents, cement, permeability modifiers, drilling muds, emulsifiers, demulsifiers, tracers, flow improvers etc. Illustrative well operations include, but are not limited to, hydraulic fracturing, stimulation, tracer injection, cleaning, acidizing, steam injection, water flooding, cementing, etc.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited.

What is claimed is:

1. An acoustic device for sensing or transmitting an acoustic signal at least partially traveling through a borehole fluid within a wellbore, the acoustic device comprising:

a compensation fluid;

an acoustic transducer at least partially disposed in the compensation fluid and configured to sense the acoustic signal; and a metallic cover that separates the compensation fluid from the borehole fluid and configured to deform in response to a pressure difference between the borehole fluid and the compensation fluid, wherein the pressure difference is created by the acoustic signal and a hydrostatic pressure in the borehole fluid.

2. The acoustic device of claim 1, wherein the metallic cover is substantially circular.

3. The acoustic device of claim 1, wherein the compensation fluid is disposed within a housing and the metallic cover is welded to the housing.

4. The acoustic device of claim 3, wherein the housing includes a pressure feed-through comprising at least one electrical connection.

5. The acoustic device of claim 3, further comprising an insulating material between the acoustic transducer and the housing configured to provide at least one of an electrical insulation, an acoustic insulation, and a damping of mechanical shock or vibration.

6. The acoustic device of claim 5, wherein the insulating material comprises rubber.

7. The acoustic device of claim 5, wherein the insulating material comprises two or more layers.

8. The acoustic device of claim 1, wherein the metallic cover has one or more corrugations.

9. The acoustic device of claim 1, wherein the acoustic transducer has an inner surface that is radially inward with respect to an axis of the acoustic device and a terminal for electrical connection extending from the inner surface.

10. The acoustic device of claim 1, wherein the acoustic device is operable at a hydrostatic pressure of up to 30 kpsi and a temperature of up to 175° C.

11. A system for use in a wellbore comprising a work string and the acoustic device of claim 1.

12. A method for sensing or transmitting an acoustic signal at least partially traveling through a borehole fluid within a wellbore, the method comprising:

conveying an acoustic device into the wellbore; the acoustic device comprising:

a compensation fluid, an acoustic transducer at least partially disposed in the compensation fluid and configured to sense the acoustic signal, a metallic cover that separates the compensation fluid from the borehole fluid and configured to deform in response to a pressure difference between the borehole fluid and the compensation fluid, wherein the pressure difference is created by the acoustic signal and a hydrostatic pressure in the borehole fluid, and a processor in connection with the acoustic transducer; and sending or receiving an electric signal with the processor to or from the acoustic transducer.

13. The method of claim 12, wherein the metallic cover is substantially circular.

14. The method of claim 12, wherein the compensation fluid is disposed within a housing and the metallic cover is welded to the housing.

15. The method of claim 14, wherein the housing includes a pressure feed-through comprising at least one electrical connection to send or receive the electric signal with the processor to or from the acoustic transducer.

16. The method of claim 14, further comprising an insulating material between the acoustic transducer and the housing configured to provide at least one of an electrical insulation, an acoustic insulation, and a damping of mechanical shock or vibration.

17. The method of claim 16, wherein the insulating material comprises rubber.

18. The method of claim 12, wherein the metallic cover has one or more corrugations.

19. The method of claim 12, wherein the acoustic transducer has an inner surface that is radially inward with respect to an axis of the acoustic device and a terminal for electrical connection extending from the inner surface.

* * * * *